United States Patent
Forssen et al.

(10) Patent No.: US 12,469,653 B2
(45) Date of Patent: Nov. 11, 2025

(54) PRESSURE PULSE DIAGNOSTICS OF AN OLTC

(71) Applicant: Hitachi Energy Ltd, Zürich (CH)

(72) Inventors: Cecilia Forssen, Västerås (SE); Nilanga Abeywickrama, Västerås (SE); Bengt-Olof Anders Stenestam, Ludvika (SE); Joachim Schiessling, Enköping (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/870,666

(22) PCT Filed: Feb. 7, 2023

(86) PCT No.: PCT/EP2023/052996
§ 371 (c)(1),
(2) Date: Nov. 30, 2024

(87) PCT Pub. No.: WO2024/012721
PCT Pub. Date: Jan. 18, 2024

(65) Prior Publication Data
US 2025/0174416 A1    May 29, 2025

(30) Foreign Application Priority Data
Jul. 14, 2022 (EP) ..................... 22184946

(51) Int. Cl.
*H01H 9/00* (2006.01)
*H01H 33/668* (2006.01)

(52) U.S. Cl.
CPC ........ *H01H 9/0038* (2013.01); *H01H 33/668* (2013.01); *H01H 2009/0061* (2013.01)

(58) Field of Classification Search
CPC .. H01H 9/0038; H01H 9/0027; H01H 9/0005; H01H 9/0011; H01H 9/0016;
(Continued)

(56) References Cited

U.S. PATENT DOCUMENTS 7,145,760 B2 * 12/2006 Stenestam .......... G01R 31/3274
361/115
7,982,142 B2 * 7/2011 Jonsson ............... H01H 9/0038
200/11 TC
(Continued)

FOREIGN PATENT DOCUMENTS

CN    102460624 A    5/2012
CN    208889457 U    5/2019
(Continued)

OTHER PUBLICATIONS

Extended European Search Report for European Patent Application No. 22184946.6, dated Jan. 17, 2023, 5 pages.
(Continued)

*Primary Examiner* — William A Bolton
(74) *Attorney, Agent, or Firm* — Sage Patent Group

(57) ABSTRACT

The disclosure relates to a method for monitoring a vacuum on-load tap changer including determining a total main vacuum interrupter opening time as a time elapsed between a first point in time and a second point in time, a total resistor vacuum interrupter opening time as a time elapsed between the third point in time and the fourth point in time, a circulating current time as a time elapsed between the second point in time and the third point in time, and/or a switch time as the sum of the total main vacuum interrupter opening time, the total resistor vacuum interrupter opening time and the circulating current time.

11 Claims, 8 Drawing Sheets

(58) Field of Classification Search
CPC ... H01H 2009/0061; H01H 2009/0055; H01H 33/668; H02H 3/00; G01R 31/133; G01R 31/027
USPC ............... 200/11 TC; 218/118; 361/115
See application file for complete search history.

(56) References Cited

U.S. PATENT DOCUMENTS

| | | | | |
|---|---|---|---|---|
| 9,442,150 | B2 | 9/2016 | Jain | |
| 9,697,962 | B2* | 7/2017 | Teising | H01H 3/30 |
| 9,959,736 | B2* | 5/2018 | Jain | G08B 21/182 |
| 10,473,707 | B2* | 11/2019 | Bengtsson | G01R 31/62 |
| 10,742,019 | B2* | 8/2020 | Stenestam | H02H 1/0007 |
| 2020/0114393 | A1* | 4/2020 | Frimpong | G01R 31/62 |

FOREIGN PATENT DOCUMENTS

| | | |
|---|---|---|
| CN | 114175197 A | 3/2022 |
| WO | 2020239511 A1 | 12/2020 |

OTHER PUBLICATIONS

International Search Report and Written Opinion of the International Searching Authority, PCT/EP2023/052996, mailed Apr. 11, 2023, 14 pages.

Lopes, Felipe et al., "Using the Differentiator-Smoother Filter to Analyze Traveling Waves on Transmission Lines: Fundamentals Settings and Implementation," International Conference on Power Systems Transients (IPST 2019), Perpignan, France, Jun. 17-20, 2019, 6 pages.

Office Action, CN Patent Application No. 202380053710.8, mailed May 18, 2025, 5 pages.

* cited by examiner

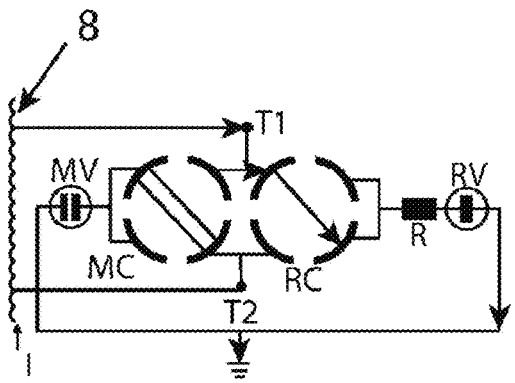
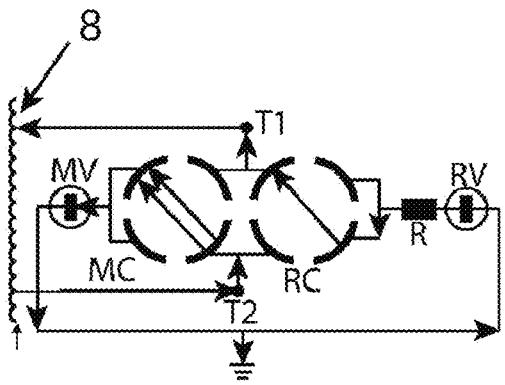
Fig. 3e
(Prior Art)
Fig. 3f
(Prior Art)
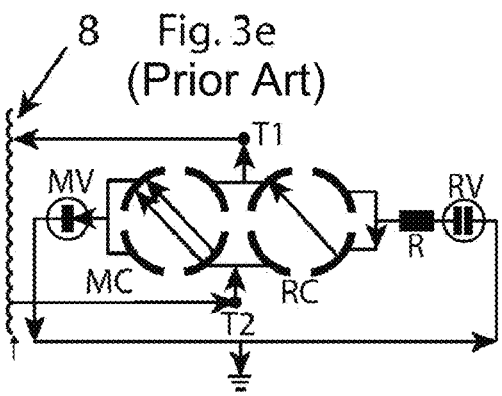
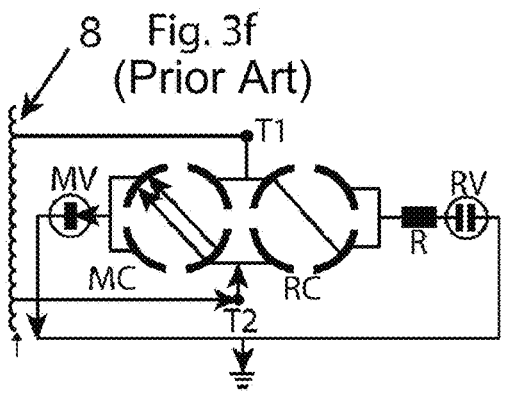
Fig. 3g
(Prior Art)
Fig. 3h
(Prior Art)
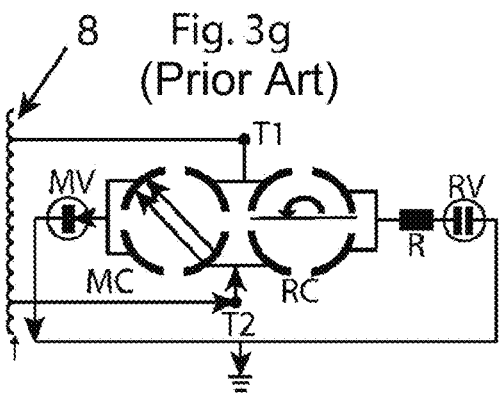
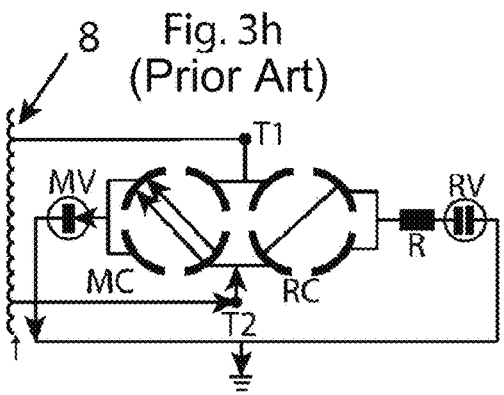
Fig. 3i
(Prior Art)
Fig. 3j
(Prior Art)
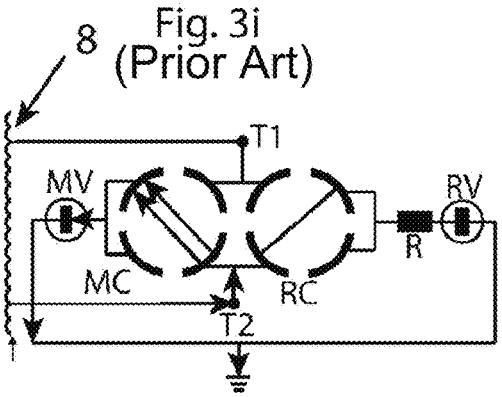
Fig. 3k
(Prior Art)

PRESSURE PULSE DIAGNOSTICS OF AN OLTC

CROSS REFERENCE TO RELATED APPLICATIONS

This application is a 35 U.S.C. § 371 national stage application of PCT International Application No. PCT/EP2023/052996 filed on Feb. 7, 2023, which in turn claims foreign priority to European Patent Application No. 22184946.6, filed on Jul. 14, 2022, the disclosures and content of which are incorporated by reference herein in their entirety.

TECHNICAL FIELD

The present disclosure relates to a method and a monitoring system for monitoring a vacuum on-load tap changer.

BACKGROUND

A tap changer is a device used with transformers for regulation of the voltage levels. The regulation is achieved by having the tap changer altering the number of turns in the winding of the transformer.

On-load tap changers, OLTC, generally comprise a diverter switch and a tap selector switch operating as a unit to effect current transfer from one voltage tap to the next.

The diverter switch does the entire on-load making and breaking of currents, whereas the tap selector preselects the tap to which the diverter switch will transfer the load current. The tap selector operates off load.

When the power output from a transformer is to be changed from one voltage level to another, the change occurs by first connecting the tap selector to that tapping point of the transformer winding which corresponds to the new voltage level while the diverter switch still feeding from the existing voltage level. The connection of the tap selector thus takes place without current load. When the tap selector is connected to the tap for the new voltage level, a switching operation takes place with the aid of the diverter switch such that output current is taken out from the new tapping point of the transformer. When a transformer has a plurality of tapping points, switching normally only occurs between two tapping points which are close to each other in terms of voltage. If an adjustment to a more distant location should be required, this takes place step by step.

A diverter switch of the kind referred to here is normally used for control of power or for distribution transformers. The OLTC may also advantageously be used for control of other types of electrical devices, such as, power transmission or distribution products, such as reactors, industrial transformers, phase shifters, capacitors, or the like.

The operation of the diverter switch involves commutation from one circuit to another with ensuing occurrence of an electric arc. The diverter switch, together with all subsystems, is placed in a housing and submerged in an insulating fluid, such as oil. The OLTC comprises the housing together with insulating fluid, diverter switches and subsystems.

The insulating fluid in the tank acts as electric insulator and as a coolant to remove the generated heat in the OLTC. The insulating fluid will also quench the arcs generated during switching. Arcing during the operation of the OLTC will pollute the insulating fluid and wear the switch contacts.

To overcome arcing in the insulating fluid, it is previously known to use vacuum switches or, in other words, vacuum interrupters for those switching operations where an arc arises. The electrical contact wear and arcs will then only arise in the vacuum interrupter. For an appropriate procedure from an electrical point of view, a diverter switch of this kind is provided with at least one main branch and one resistance branch, each with a vacuum interrupter.

In case of a vacuum interrupter failure, the auxiliary contact system in the OLTC is capable of breaking the current a limited number of times, depending on OLTC type and load, possibly between 10 to 500 times. If the auxiliary contact system, i.e., the movable contact of the diverter switch, has to break the current more than the limit number of times, the wear caused by arcs leads to that the contacts no longer connect and lead current. If auxiliary main contacts cannot connect, two things can happen:

1. The main circuit is interrupted, and the load is carried over the resistance circuit. With the continuous full load on the transition resistor, the resistor will eventually melt and break with a growing arc inside the OLTC as a result. This arc will hopefully be detected and should result in an immediate emergency shut-down of the OLTC-transformer system. A long repair or exchange of the diverter switch will be the result and during the repair time the transformer will be off-line.

2. A standing arc appears over auxiliary contacts which could lead to a short circuit between two phases which will lead to a catastrophic failure, e.g., explosion or fire. If one is lucky, the standing arc is quenched, and one is back to point 1.

As previously explained, when an OLTC fails, there is a risk of explosion or fire. Therefore, there is always a need for improving the control of an OLTC to avoid such failures.

A manner of avoiding failures and alerting about degradation of the diverter switch of the OLTC is to monitor the switching time of the diverter switch. Changes in the switching time may indicate degraded components which may need to be maintained or replaced.

Another difficulty of the pressure pulse analysis is the variation of the overall shape. To monitor the system for a particular shape in the pressure pulses is a challenge. For an online monitoring system, time extraction has to be robust and generic so that it can be applied on any tap changer installation with minimum or no tailor-making.

SUMMARY

Therefore, an object of the disclosure is to provide an improved method and a monitoring system for monitoring a vacuum on-load tap changer. More specifically, an object of the disclosure is to provide a robust method for monitoring a vacuum on-load tap changer which is able to handle background oscillations. Another object of the disclosure is to provide a monitoring system configured to perform the method according to the disclosure.

According to a first aspect of the present disclosure, the object is at least partly achieved by a method according to claim 1.

Hence, there is provided a method, for monitoring a vacuum on-load tap changer, wherein the tap changer comprises a housing filled with insulating fluid. A diverter switch is arranged inside of the housing and comprises at least one movable contact and at least two vacuum interrupters comprising at least a first main vacuum interrupter and at least a first resistor vacuum interrupter for interrupting a current through the at least one movable contact. At least one pressure sensor measures the pressure in the housing and transmits an output signal to a processing unit.

The method comprises continuously measuring the pressure in the housing with the pressure sensor and transmitting the output signal of the sensor to the processing unit, for detecting opening and closing of the at least two vacuum interrupters. The pressure increases when a respective one of the at least two vacuum interrupters is opened and drops when it closes. The method further comprises processing the output signal of the sensor with the processing unit to detect at least a first pressure increase associated with an opening of the at least first main vacuum interrupter, a subsequent first pressure decrease associated with a closing of the at least first main vacuum interrupter, and to detect at least a second pressure increase associated with an opening of the at least first resistor vacuum interrupter, and a subsequent second pressure decrease associated with a closing of the at least first resistor vacuum interrupter. The method further comprises determining at least a first point in time associated with the opening of the at least first main vacuum interrupter, a subsequent second point in time associated with a closing of the at least first main vacuum interrupter, a third point in time associated with the opening of the at least first resistor vacuum interrupter, and a subsequent fourth point in time associated with a closing of the at least first resistor vacuum interrupter. The method further comprises processing the output signal of the sensor with the processing unit to detect at least a second pressure increase associated with an opening of the at least first resistor vacuum interrupter and a subsequent second pressure decrease associated with a closing of the at least first resistor vacuum interrupter. The method further comprises determining a third point in time associated with the opening of the at least first resistor vacuum interrupter and a subsequent fourth point in time associated with a closing of the at least first resistor vacuum interrupter. The method further comprises determining a total main vacuum interrupter opening time as a time elapsed between the first point in time and the second point in time, a total resistor vacuum interrupter opening time as a time elapsed between the third point in time and the fourth point in time, a circulating current time as a time elapsed between the second point in time and the third point in time, and/or a switch time as the sum of the total main vacuum interrupter opening time, the total resistor vacuum interrupter opening time and the circulating current time.

As disclosed above, the method allows the determination of total main vacuum interrupter opening time, the total resistor vacuum interrupter opening time, the circulating current time and the switch time. If the determined times differ from a respective reference value, it may indicate degradation of one or more parts of the vacuum OLTC.

The method allows detection of the sharp flanks of the pressure pulses generated by the opening and closing of the vacuum interrupters. Points in time for each of the opening and closing of the main vacuum interrupter and the resistor vacuum interrupter may be determined to estimate the health of the system. However, in case of failure, where a vacuum interrupter fails to open or close, this would of course also be detected by the method because less than four flanks would be detected during monitoring. However, such a serious failure would be detected anyway since the tap changing operation would fail completely if one of the vacuum interrupters should fail to open or close. The method of the present disclosure is rather intended to monitor the system before it fails completely, so that it may be serviced and maintained without causing a major interruption in the operation of the tap changer or in the transformer that the tap changer is connected to.

Monitoring of the switching times particularly allows planning maintenance of the tap changer/transformer, such as to plan the switching off of the transformer to service the tap changer. Further, monitoring of the tap changer allows prevention of accidents and unplanned breaks in operation, which may otherwise result from tap changer failure.

Optionally, the processing of the output signal of the sensor comprises application of a step function to the output signal to generate a filtered signalstep function.

A step function is herein to be understood as a signal processing method using a step function which allows detection of sharp flanks in the pressure pulses. The processing of the output signal thus only reacts to fast, step-like changes in the signal and results in the generation of the filtered signal. Thereby, the background oscillations may be ignored, resulting in a robust and generic method which may be applied to any tap changer installation with minimum or no adjustment to individual installations.

Optionally, the application of the step function to the output signal is a convolution of the output signal with the step function to generate the filtered signalstep function.

In more mathematical terms, the convolution is herein to be understood as a signal processing method in which the output signal is used as a first function which is processed/convoluted with a second function, i.e., the step function, resulting in a third function—the filtered signal. When the third function shows a response, it may be interpreted as evidence of a sharp positive or negative flank in the output signal, i.e., a pressure pulse in the insulating fluid. From the third function/filtered signal, points in time may be determined. The convolution method is particularly robust in the present application of monitoring tap changers because of its filtering properties, such as the filtering out background oscillations from the pressure pulses arising from the direct opening and closing of the main vacuum interrupter and the resistor vacuum interrupter.

Optionally, determining the first point in time and the second point in time and determining the third point in time and the fourth point in time comprises derivation of the processed/filtered output signal. Applying a step function, such as a step convolution function, detects a point in time which may be located in the middle of a slope of a rise or fall in a pressure pulse. Such a time estimate may be enough for detecting trends and changes in a tap changer system. However, derivation of the processed/filtered signal may provide better accuracy when determining when the detected pressure pulses start and end. Thereby, more accurate switching times may be determined, enabling a more accurate estimation of the health of the tap changer system.

Optionally, the method further comprises generating an alert if any one of the total main vacuum interrupter opening time, the total resistor vacuum interrupter opening time, the circulating current time and/or the switch time differs from a respective reference time by more than a respective first threshold value. An operator can thus be informed that one or more components of the OLTC is/are malfunctioning. Appropriate actions can then be taken by the operator, such as shutting down a transformer comprising the tap changer, scheduling maintenance and/or exchanging malfunctioning parts.

Optionally, the method further comprises shutting off a transformer electrically connected to the tap changer if any one of the total main vacuum interrupter opening time, the total resistor vacuum interrupter opening time, the circulating current time and/or the switch time differs from a respective reference time by more than a respective second threshold value, which respective second threshold value is greater than the respective first threshold value. By opening shutting off the transformer, imminent and serious accidents may be avoided in case parts of the tap changer show significant deviations from the reference values.

According to a second aspect of the present disclosure, the object is at least partly achieved by a processing unit according to claim 7.

Hence, there is provided a processing unit for processing the output signal according to the method of any one of the embodiments of the first aspect of the disclosure.

The processing unit may thus process the output signal of the sensor and detect fast changes in the pressure, resulting from the opening and closing of the vacuum interrupters. The processing unit may alternatively process the output signal, carry out algorithms and/or perform computations by application of functions or filters, such as a step functions, or convolution filters, to the output signal and/or by derivation of the output signal.

According to a third aspect of the present disclosure, the object is at least partly achieved by a monitoring system according to claim 8.

Hence, there is provided a monitoring system for a vacuum on-load tap changer comprising a housing filled with insulating fluid, a diverter switch arranged inside of the housing and comprising at least one movable contact and at least two vacuum interrupters comprising a main vacuum interrupter and a resistor vacuum interrupter for interrupting a current through the at least one movable contact, at least one pressure sensor and a processing unit, which pressure sensor is configured for measuring the pressure in the housing and for transmitting an output signal to the processing unit, the monitoring system further being configured to carry out the method according to the method of any one of the embodiments of the first aspect of the disclosure.

The monitoring system, including the processing unit, according to the present disclosure is thus well adapted to perform the monitoring of a vacuum OLTC.

According to a fourth aspect of the present disclosure, the object is at least partly achieved by a computer program according to claim 9.

Hence, there is provided a computer program comprising program code means for performing the method according to any one of the embodiments of the first aspect of the present disclosure when said program is run on the processing unit of the second aspect comprised in the third aspect of the disclosure.

The computer program is thus adapted to instruct the processing unit to perform any algorithms for the processing of the output signal of the sensor.

According to a fifth aspect of the present disclosure, the object is at least partly achieved by the computer readable medium carrying a computer program comprising program code means according to claim 10.

Hence, there is provided a computer readable medium carrying a computer program comprising program code means for performing the method according to any one of the embodiments of the first aspect of the disclosure when said program is run on the processing unit according to the second aspect comprised in the monitoring system of the aspect of the disclosure.

The computer readable medium may be any form of storage suitable for comprising the computer program. The computer readable medium may be comprised in the processing unit. It may alternatively be an external computer readable medium, connectable to the processing unit. Optionally, it may be comprised in a cloud service accessible by the processing unit.

According to a sixth aspect of the present disclosure, the object is at least partly achieved by a transformer arrangement comprising the monitoring system according to claim 8.

Hence, there is provided a transformer arrangement (Y) comprising a transformer, a vacuum on-load tap changer and the monitoring system according to the third aspect of the disclosure.

The monitoring system according to the present disclosure is readily adaptable to various transformer installations comprising vacuum on-load tap changers.

BRIEF DESCRIPTION OF THE DRAWINGS

Further objects and advantages of, and features of the disclosure will be apparent from the following description of one or more embodiments, with reference to the appended drawings, where:

FIG. 3a-k show a simplified step-by-step process of changing tap in an OLTC.

DETAILED DESCRIPTION

The present disclosure is developed in more detail below referring to the appended drawings which show examples of embodiments. The disclosure should not be viewed as limited to the described examples of embodiments. Like numbers refer to like elements throughout the description.

The terminology used herein is for the purpose of describing particular aspects of the disclosure only and is not intended to limit the invention. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this disclosure belongs.

Figure 1:
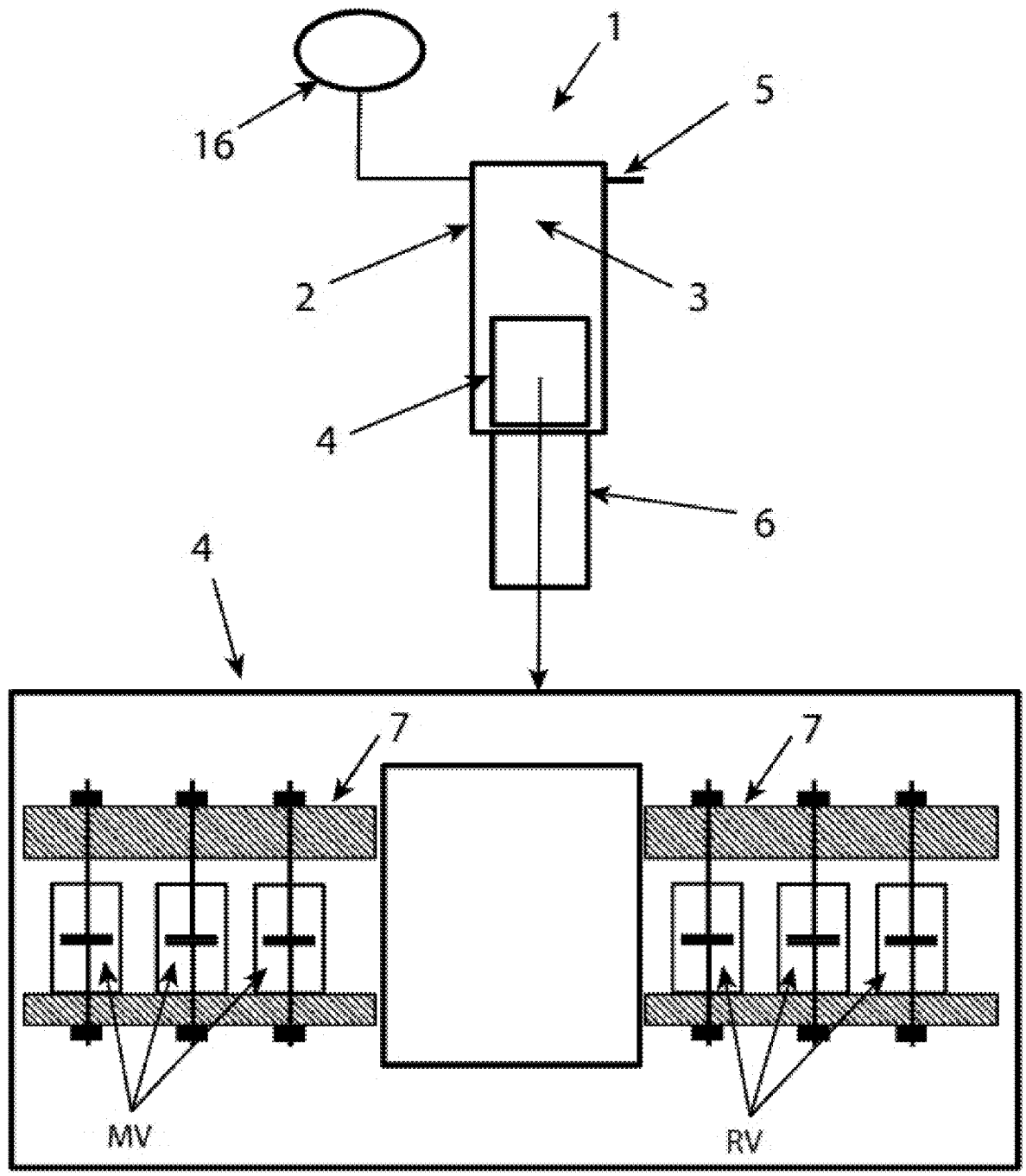
FIG. 1 shows an example of a vacuum type of tap changer with a zoomed-in view of the diverter switch.

The disclosure provides a method and a monitoring system 10, for monitoring a vacuum on-load tap changer, OLTC. FIG. 1 shows an example of a vacuum-type tap changer with a zoomed-in view of a diverter switch 4. In the example, it is shown that the OLTC 1 has a housing 2 with insulating fluid 3, a diverter switch 4, a pressure sensor 5 and a tap selector 6. The zoomed-in diverter switch 4 shows a white square in the middle. The white square represents parts of the diverter switch 4 that are not necessary to show for the purposes of this disclosure. On the sides of the white square, vacuum interrupters MV, RV are illustrated. There are three interrupters MV and three interrupters RV, one for each phase in the illustrated example. The disclosure is also applicable to single phase and two phases. The vacuum interrupters MV, RV are opened and closed by a yoke 7. Please note that the yoke opening all three vacuum interrupters at the same time is an example of how to open and close the vacuum interrupters. Other ways are possible.

Figure 2:
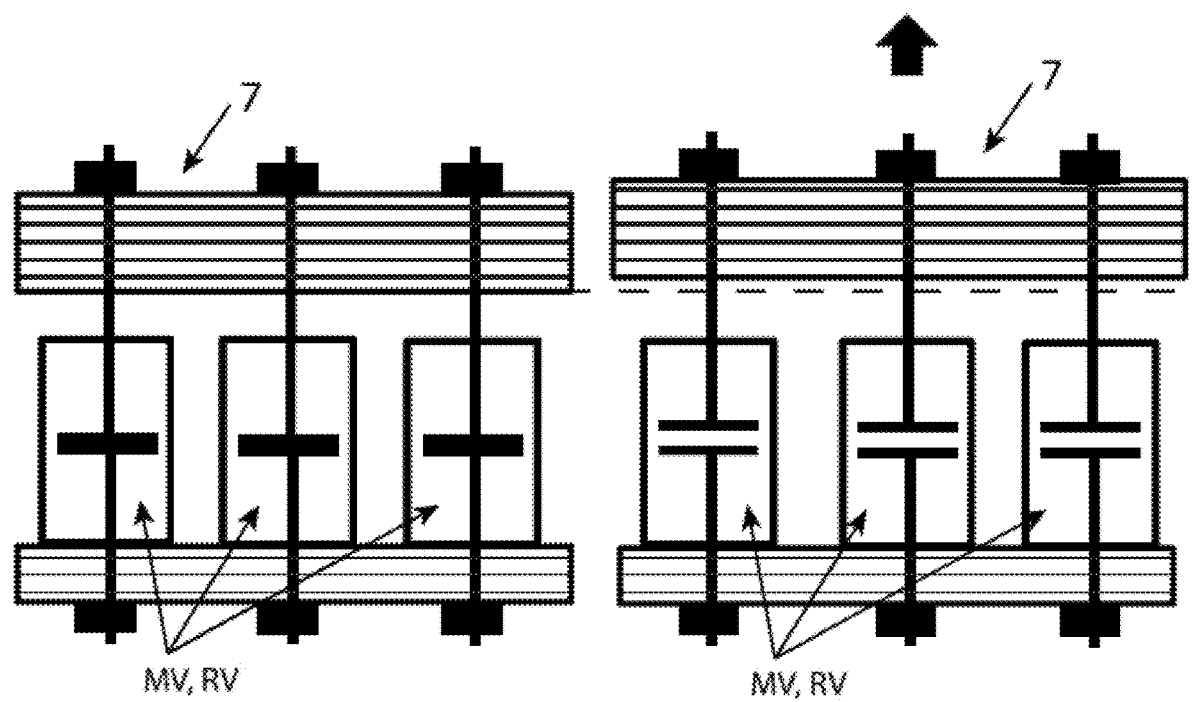
FIG. 2 shows a simplified vacuum interrupter design where two sets of three vacuum interrupters, one for each phase, are opened and closed simultaneously by a yoke.

In FIG. 2, a simplified vacuum interrupter design is shown, where two sets of three vacuum interrupters MV, RV, one for each phase, are opened and closed simultaneously by a yoke 7. In the left part of the figure, the three vacuum interrupters are closed and in the right part, they are opened.

FIGS. 3*a-k* shows a simplified step-by-step process of changing tap in an OLTC 1. The movable contact of the diverter switch 4 is in this case, the rotatable main auxiliary contact MC, on a main side of the diverter switch 4, and the resistor auxiliary contact RC, on a resistor side of the diverter switch 4. The figures show a simplified view of an OLTC 1 for illustrative purposes. Please note that there are OLTCs with only one moveable contact. Arrows indicate the current path through the OLTC 1. As can be seen to the left at the tap winding 8, a connection over T1 gives different amount of tap winding turns than a connection over T2.

Figure 3A:
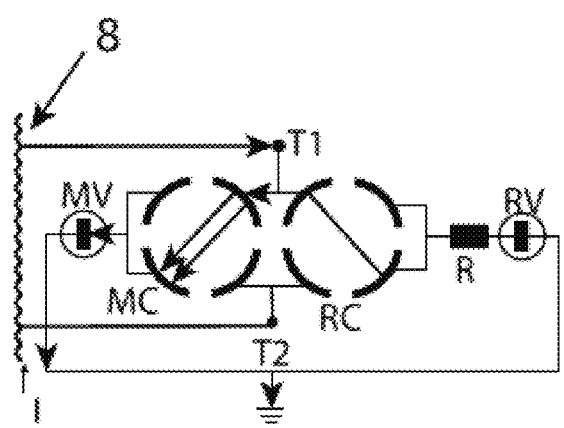
Figure 3B:
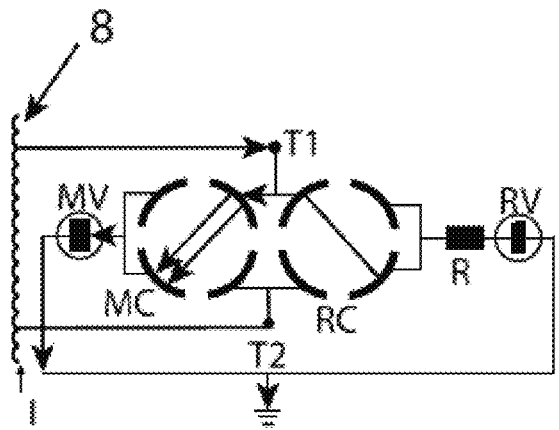
Figure 3C:
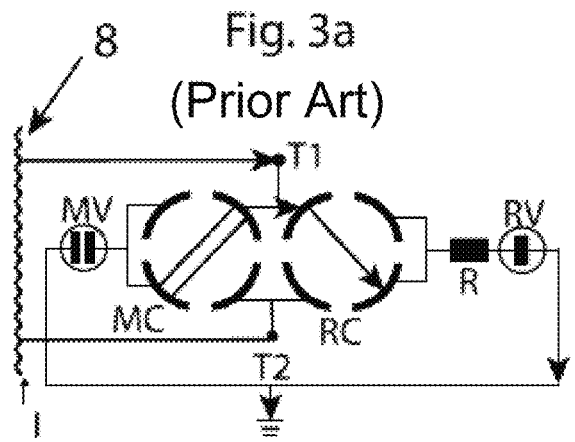
Figure 3D:
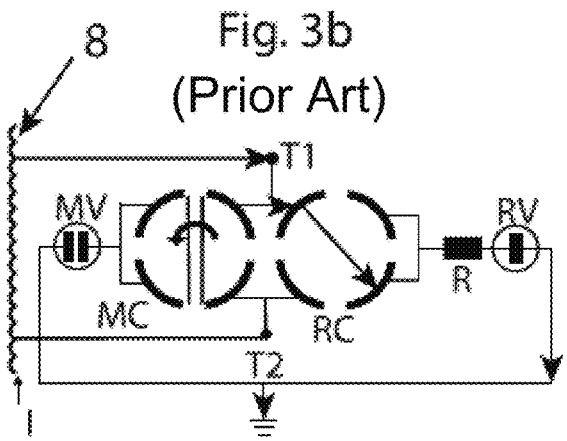

In FIG. 3*a*, a service position for tap T1 is shown. The steps to switch to tap T2 are shown in FIGS. 3*b-k*. In FIG. 3*b*, the main vacuum interrupter MV, is opened and there is an arc in the vacuum bottle. When the arc has stopped, all current will go through the resistor side, as shown in FIG. 3*c*. Keeping the main vacuum interrupter MV open, the main auxiliary contact MC is now turned, as shown in FIG. 3*d*. The main auxiliary contact MC is now fully turned to connect to tap T2, but the main vacuum interrupter MV is still open so that the current still goes through the resistor side, as shown in FIG. 3*e*. The main vacuum interrupter MV now closes, the load current now goes in the MV and a circulating current starts through MV and RV due to the voltage difference between T1 and T2, as shown in FIG. 3*f*. In the next step, shown in FIG. 3*g*, the resistor vacuum interrupter RV is opened and there is an arc in it due to the circulating current. The load current is not affected by this and remains the same. When the arc has stopped, the circulating current path through T1 is stopped. The load current continues to go through T2 as shown in FIG. 3*h*. The resistor auxiliary contact RC is now rotated as shown in FIG. 3*i*. In FIG. 3*j*, the resistor auxiliary contact RC is in position, but the resistor vacuum interrupter RV is still open. It is closed in the next step as shown in FIG. 3*k*, which is the service position for tap T2. In the figures, the resistor side also has a connected resistor R.

Figure 4:
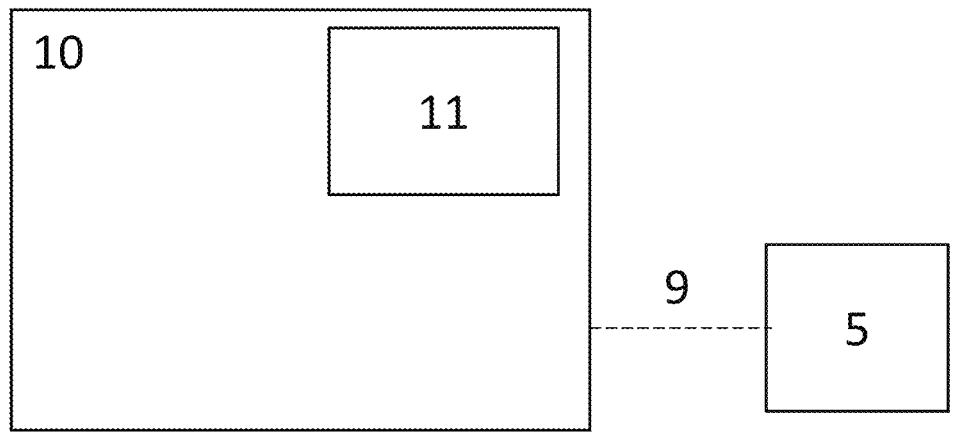
FIG. 4 shows an illustration of a monitoring system.

FIG. 4 shows an illustration of a monitoring system 10 for a vacuum on-load tap changer 1. As previously described, the OLTC 1 comprises a housing 2 filled with insulating fluid 3, a diverter switch 4 arranged inside of the housing 2 and comprising at least one movable contact MC, RC and at least two vacuum interrupters MV, RV for interrupting a current through the at least one movable contact. It should be noted that the at least one moveable contact may be a moveable in a non-physical manner. That is, the at least one moveable contact may be moveable in the sense that an electrical system for example redirects the current to move the contact.

The monitoring system 10 comprises at least one pressure sensor 5 which measures the pressure in the housing 2 and transmits an output signal to a processing unit 11, for detecting opening and closing of the at least two vacuum interrupters MV, RV. The pressure sensor 5 is also illustrated in FIG. 1, where it is arranged in an upper part of the housing 2 of the OLTC 1. The pressure sensor may be placed on the side of the upper part of the diverter switch housing. It can also be placed on the cover, i.e., the top, of the diverter switch housing. The processing unit 11 receives the sensor data as an output signal from the pressure sensor 5 via communication means 9. The communication means may be any kind of communication, wired communication or wireless communication via, for example, Wi-Fi, Bluetooth, Z-wave or Zigbee. Alternatives for the communication between the processing unit 11 and the pressure sensor 5 are known to the skilled person and will not be further discussed.

Figure 5:
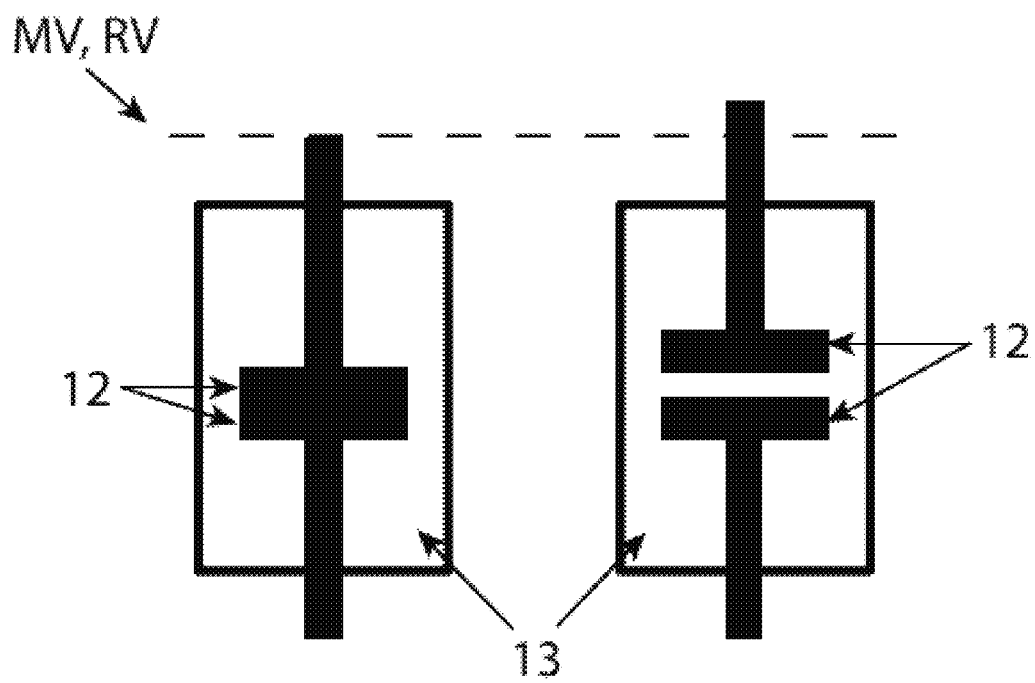
FIG. 5 shows a simplified vacuum interrupter design.

In FIG. 5, an example vacuum interrupter is shown in a closed position to the left and an open position to the right. The contacts 12 are abutting in the closed position and are separated in the open position. In the housing 2 around the contacts, there is vacuum 13. As can be seen in the figure, the volume that the vacuum interrupter uses in the OLTC 1 increases when the vacuum interrupter is opened. The pressure in the insulating fluid 3 thus increases when a vacuum interrupter is opened.

The processing unit 11 is arranged to process the output signal of the sensor 5 to detect a pressure increase and a pressure decrease associated with an opening and closing of the main vacuum interrupter MV, and a subsequent pressure increase, and a pressure decrease associated with an opening and closing of the resistor vacuum interrupter RV. The processing unit may thereby determine points in time for the opening and closing of the main vacuum interrupter MV and the resistor vacuum interrupter RV, which in turn allows determining a total main vacuum interrupter opening time TMV, a total resistor vacuum interrupter opening time TRV, a circulating current time TCC, i.e., the time during which a current circulates through MV and RV due to the voltage difference between the taps T1 and T2, as described in conjunction with FIG. 3*f* above. The processing unit may further determine a switch time TS. The switch time is the total time for performing a tap change. In other words, it is calculated as the sum of the total main vacuum interrupter opening time TMV, the total resistor vacuum interrupter opening time TRV and the circulating current time TCC.

Figure 6:
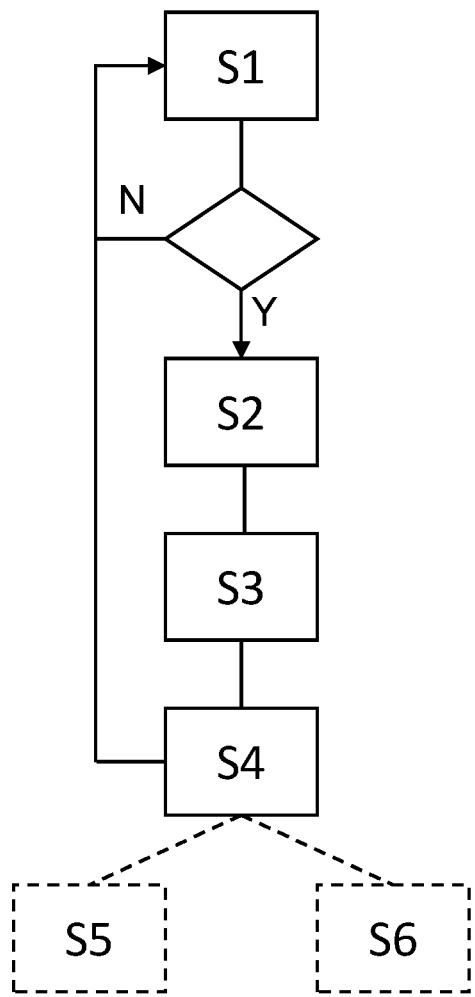
FIG. 6 shows a flowchart of a method according to a main aspect of the present disclosure.

FIG. 6 shows a flow chart of a method for monitoring a vacuum on-load tap changer according to a first aspect of the present disclosure. The boxes with a solid line illustrate steps of the method in the broadest embodiment and the boxes with dashed lines represent alternative steps. As outlined above, the tap changer comprises the housing 2 filled with insulating fluid 3, the diverter switch 4 arranged inside of the housing 2 and comprising at least one movable contact MC, RC and at least two vacuum interrupters comprising at least the first main vacuum interrupter MV and at least the first resistor vacuum interrupter RV for interrupting a current through the at least one movable contact. The tap changer further comprises the at least one pressure sensor 5 which measures the pressure in the housing 2 and transmits the output signal to the processing unit 11.

The method comprises continuously measuring S1 the pressure in the housing 2 with the pressure sensor 5 and transmitting the output signal of the sensor 5 to the processing unit for detecting opening and closing of the at least two vacuum interrupters MV, RV. The pressure increases when a respective one of the at least two vacuum interrupters is opened and drops when it closes.

Further, the method comprises processing S2 the output signal of the sensor 5 with the processing unit 11. The processing S2 serves to detect at least a first pressure increase associated with an opening of the at least first main vacuum interrupter MV, a subsequent first pressure decrease associated with a closing of the at least first main vacuum interrupter MV, and to detect at least a second pressure increase associated with an opening of the at least first resistor vacuum interrupter RV, and a subsequent second pressure decrease associated with a closing of the at least first resistor vacuum interrupter RV. If no pressure pulse is detected by the processing unit 11, the monitoring system 10 continues measuring the pressure in the housing 2, as symbolized by the arrow N in FIG. 1.

A third step of the method involves determining S3 at least a first point in time t1 associated with the opening of the at least first main vacuum interrupter MV, a subsequent second point in time t2 associated with a closing of the at least first main vacuum interrupter MV, a third point in time t3 associated with the opening of the at least first resistor vacuum interrupter RV, and a subsequent fourth point in time t4 associated with a closing of the at least first resistor vacuum interrupter RV.

Determining S3 the respective points in time enables determining S4 a total main vacuum interrupter opening time TMV as a time elapsed between the first point in time t1 and the second point in time t2, a total resistor vacuum interrupter opening time TRV as a time elapsed between the third point in time t3 and the fourth point in time t4, a circulating current time TCC as a time elapsed between the second point in time t2 and the third point in time t3, and/or a switch time TS as the sum of the total main vacuum interrupter opening time TMV, the total resistor vacuum interrupter opening time TRV and the circulating current time TCC.

Determining S4 the main vacuum interrupter opening time TMV, the resistor vacuum opening time TRV, the circulating current time TCC and/or the switch time TS allows an estimation of the health of the various components and mechanisms involved in a tap change operation, i.e., an estimation of the mechanical and electrical performance of the tap changer. As an example, the main vacuum interrupter opening time TMV and the circulating current time TCC must not exceed a predetermined critical time, because the resistor of the tap changer will heat up as current is passed therethrough, which may result in formation of gasses and deterioration of the dielectric and/or mechanical properties of the insulating fluid.

While the processing unit 11 detects pressure pulses and determines points in time, the monitoring system 10 continues measuring S1 the pressure in the housing 2, as symbolized by the arrow from S4 to S1 in FIG. 6.

The processing S2 of the output signal from the sensor 5 by the processing unit 11 allows detection of pressure pulses even when background oscillations are present in the insulating fluid 3. The processing S2 may comprise applying a filter, such as a step function to the output signal. As described hereinabove, the step function is to be understood as an algorithm, i.e., a signal processing method run by the processing unit 11, which reacts to fast changes, but filters out background oscillations.

Figure 7:
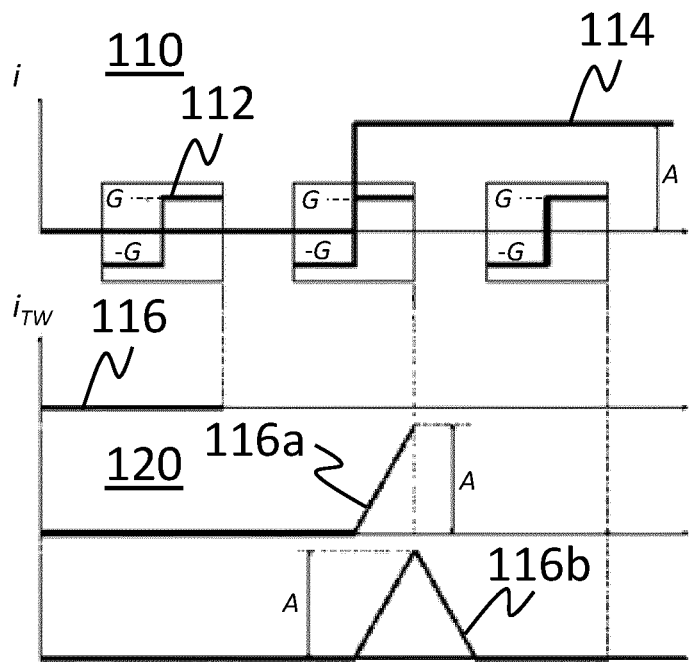
FIG. 7 shows a modified version of FIG. 3 in Lopes et al. "Using the Differentiator-Smoother Filter to Analyze Traveling Waves on Transmission Lines: Fundamentals Settings and Implementation", e.g., a diagram illustrating the application of a step function to a first function.

FIG. 7 depicts the theory behind applications of a step function, such as convolution of the output signal. The upper diagram 110 illustrates how a step function 112, having an amplitude+/−G, is applied to a signal 114, illustrating an output signal 114. A sudden change in the output signal 114, with an amplitude A, results in a filtered signal 116, shown in the lower diagram 120. The filtered signal 116 shows a pulse with a positive flank 116a, reaching an amplitude A. Since the signal 114 stays on a constant level, the filtered signal 116 returns to the initial level, shown as negative flank 116b.

In mathematical terms, the output signal 114 may be seen as a first function which is convoluted with a second function, i.e., the step function 112, resulting in a third function, which is the filtered signal 116. Only step-like changes in the first function (output signal 114) will generate a third function (filtered signal 116) due to the second function (step function 112).

Figure 8:
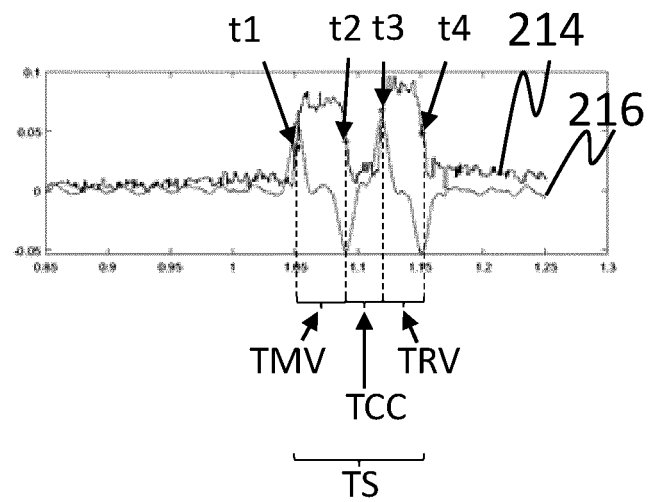
FIG. 8 illustrates a step function applied to a measured pressure pulse 214 in an OLTC installation.

FIG. 8 exemplifies a step function applied to a measured pressure pulse 214 in an OLTC installation. Opening of the main vacuum interrupter MV generates a first rapid rise of the pressure pulse 214, resulting in a positive peak in the filtered signal 216, which is determined as the first point in time t1. Closing of the main vacuum interrupter MV results in a rapid pressure decrease, generating a negative pulse in the filtered signal, which is determined as the second point in time t2. Similarly, the opening and closing of the resistor vacuum interrupter RV also generates a positive pulse and a negative pulse in the filtered signal, from which the third point in time t3 and the fourth point in time t4 may be determined, respectively.

As shown in FIG. 8, when detecting the rise and fall of the pressure pulses 214 by processing of the output signal of the sensor 5, the respective points in time t1, t2, t3, t4 are usually recorded near the middle of the positive/negative flank of the pressure pulse 214. However, what is important in monitoring tap changers is the detectability of trends and changes over time, which is decided by the precision (quantified by the standard deviation) of the estimated switching times which is of the same order of a reference measurement of a particular transformer arrangement comprising the tap changer.

The determining S3 of the first point in time t1, the second point in time t2, the third point in time t3 and the fourth point in time (t4) may comprise derivation of the processed/filtered output signal. Thereby, it is possible to estimate the switching times with a better absolute accuracy, since the start and end times of the pressure peaks are picked closer to the respective start and end.

Figure 9:
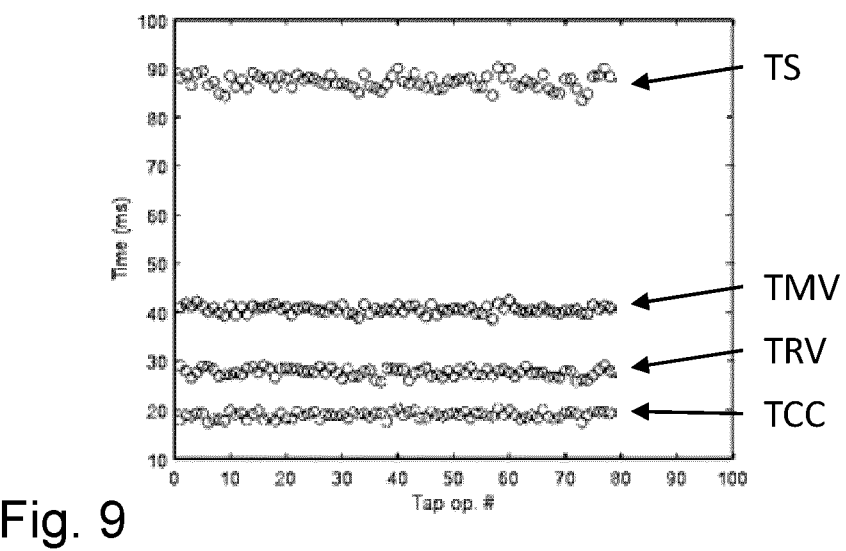
FIG. 9 shows determined times TMV, TRV, TCC and TS from a series of consecutive measurements

FIG. 9 shows determined times TMV, TRV, TCC and TS from a series of consecutive measurements. As described hereinabove, TS is the sum of TMV, TRV and TCC. By studying the times, and how they change over time, an operator can determine which measures need to be taken to maintain the tap changer in good condition. It is also possible to plan service of the system to minimize impact of an interrupted tap changer/transformer operation.

The subject matter described herein is not limited to the embodiments disclosed but may be varied and modified within the scope of the following claims.

The invention claimed is:

1. A method, for monitoring a vacuum on-load tap changer, wherein the tap changer comprises:
    a housing filled with insulating fluid,
    a diverter switch arranged inside of the housing and comprising at least one movable contact and at least two vacuum interrupters comprising at least a first main vacuum interrupter and at least a first resistor vacuum interrupter for interrupting a current through the at least one movable contact,
    at least one pressure sensor which measures pressure in the housing and transmits an output signal to a processing unit, wherein the method comprises:
    continuously measuring the pressure in the housing with the pressure sensor and transmitting the output signal of the sensor to the processing unit for detecting opening and closing of the at least two vacuum interrupters, wherein the pressure increases when a respective one of the at least two vacuum interrupters is opened and drops when the respective one closes,
    processing the output signal of the sensor with the processing unit to detect at least a first pressure increase associated with an opening of the at least first main vacuum interrupter, a subsequent first pressure decrease associated with a closing of the at least first main vacuum interrupter, and to detect at least a second pressure increase associated with an opening of the at least first resistor vacuum interrupter, and a subsequent second pressure decrease associated with a closing of the at least first resistor vacuum interrupter,
    determining at least a first point in time associated with the opening of the at least first main vacuum interrupter, a subsequent second point in time associated with a closing of the at least first main vacuum interrupter, a third point in time associated with the opening of the at least first resistor vacuum interrupter, and a subsequent fourth point in time associated with a closing of the at least first resistor vacuum interrupter, and
    determining a total main vacuum interrupter opening time as a time elapsed between the first point in time and the second point in time, a total resistor vacuum interrupter opening time as a time elapsed between the third point in time and the fourth point in time, a circulating current time as a time elapsed between the second point in time and the third point in time, and/or a switch time as a sum of the total main vacuum interrupter opening time, the total resistor vacuum interrupter opening time and the circulating current time.

2. The method according to claim 1, wherein the processing of the output signal of the sensor comprises application of a step function to the output signal to generate a filtered signal.

3. The method according to claim 2, wherein the application of the step function to the output signal is a convolution of the output signal with the step function to generate the filtered signal.

4. The method according to claim 3, wherein the determining the first point in time, the second point in time, the third point in time and the fourth point in time comprises derivation of the filtered signal.

5. The method according to claim 1, further comprising generating an alert if any one of the total main vacuum interrupter opening time, the total resistor vacuum interrupter opening time, the circulating current time and/or the switch time differs from a respective reference time by more than a respective first threshold value.

6. The method according to claim 1, further comprising shutting off a transformer electrically connected to the tap changer if any one of the total main vacuum interrupter opening time, the total resistor vacuum interrupter opening time, the circulating current time and/or the switch time differs from a respective reference time by more than a respective second threshold value, which the respective second threshold value is greater than a respective first threshold value.

7. A processing unit for processing the output signal of the method according to claim 1.

8. A monitoring system for a vacuum on-load tap changer comprising a housing filled with insulating fluid, a diverter switch arranged inside of the housing and comprising at least one movable contact and at least two vacuum interrupters comprising a main vacuum interrupter and a resistor vacuum interrupter for interrupting a current through the at least one movable contact, at least one pressure sensor and a processing unit, which pressure sensor is configured for measuring pressure in the housing and for transmitting an output signal to the processing unit, the monitoring system further being configured to carry out steps of claim 1.

9. A transformer arrangement comprising a transformer, the vacuum on-load tap changer and the monitoring system according to claim 8.

10. A computer program product comprising a non-transitory computer readable medium including program code for performing the method of claim 1 when said program code is run on a processing unit for processing the output signal of claim 1, the processing unit comprised in a monitoring system for a vacuum on-load tap changer comprising a housing filled with insulating fluid, a diverter switch arranged inside of the housing and comprising at least one movable contact and at least two vacuum interrupters comprising a main vacuum interrupter and a resistor vacuum interrupter for interrupting a current through the at least one movable contact, at least one pressure sensor and the processing unit, which pressure sensor is configured for measuring the pressure in the housing and for transmitting the output signal to the processing unit, the monitoring system further being configured to carry out steps of claim 1.

11. A non-transitory computer readable medium storing a computer program comprising program code for performing the method of claim 1 when said program code is run on a processing unit for processing the output signal of claim 1, the processing unit comprised in a monitoring system for a vacuum on-load tap changer comprising a housing filled with insulating fluid, a diverter switch arranged inside of the housing and comprising at least one movable contact and at least two vacuum interrupters comprising a main vacuum interrupter and a resistor vacuum interrupter for interrupting a current through the at least one movable contact, at least one pressure sensor and the processing unit, which pressure sensor is configured for measuring pressure in the housing and for transmitting an output signal to the processing unit, the monitoring system further being configured to carry out steps of claim 1.

* * * * *